P. C. HEWITT.
TIRE SURFACE OR COVERING.
APPLICATION FILED AUG. 26, 1905.
905,877.
Patented Dec. 8, 1908.
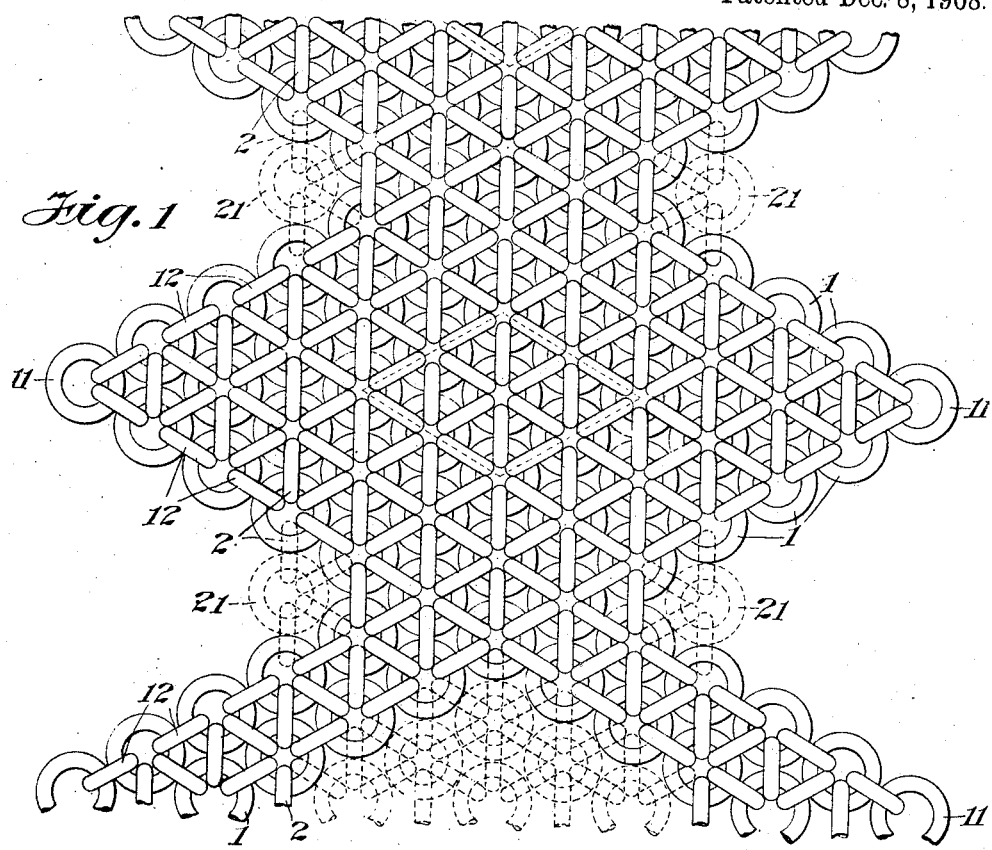
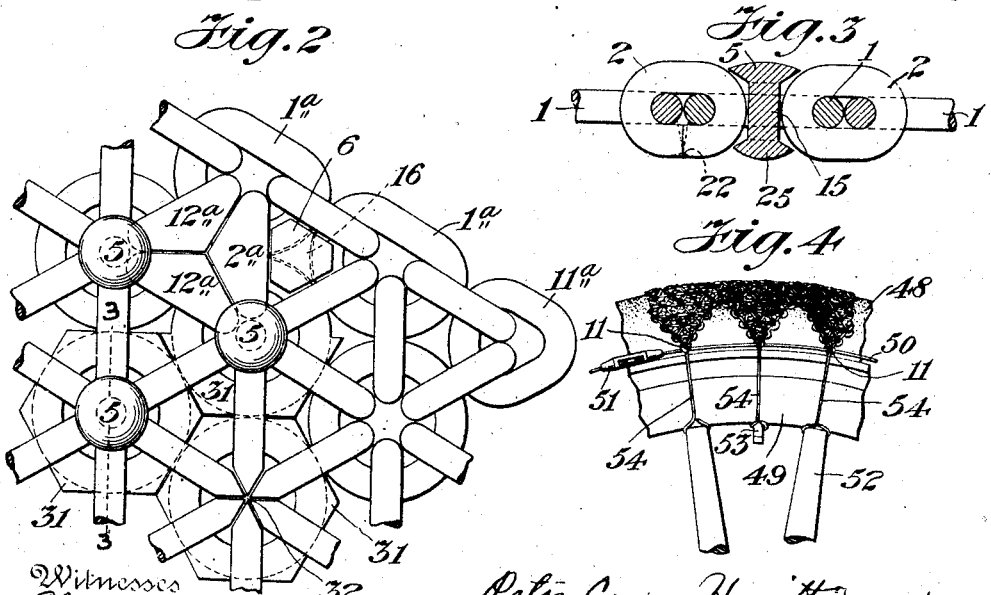

UNITED STATES PATENT OFFICE.

PETER COOPER HEWITT, OF NEW YORK, N. Y.

TIRE SURFACE OR COVERING.

No. 905,877.  Specification of Letters Patent.  Patented Dec. 8, 1908.

Application filed August 26, 1905. Serial No. 275,934.

*To all whom it may concern:*

Be it known that I, PETER COOPER HEWITT, a citizen of the United States, and a resident of New York city, in the county of New York and State of New York, have invented certain new and useful Improvements in Tire Surfaces or Coverings, of which the following is a specification.

My invention relates to surfaces or coverings for tires of vehicles particularly such as are employed on motor vehicles and automobiles. It is particularly adapted for rubber tires and is especially intended for pneumatic rubber tires.

The object of the invention is to prevent circumferential lost motion or slip and also lateral lost motion or skidding.

Another object is to save wear and tear and puncture of the tire particularly the expensive and vulnerable rubber and pneumatic tires commonly employed on automobiles, bicycles, etc.

Another object of my invention has been to produce a device efficient for these purposes at a cost so low compared with the cost of the usual pneumatic rubber tires that its use in connection therewith will result in great saving in total cost of maintenance of this part of the vehicle.

Another object of my invention is to so construct the device that while serving its purpose, it will not be likely to chafe or wear the tire, or to be broken or disarranged in such manner that displaced or broken parts thereof will cause destructive punctures or cuts. To this end, I have devised and constructed a chain link fabric which is preferably structurally independent of and detached from the rubber tire proper and which is intended to be secured thereover, preferably while the tire is deflated, and to be finally brought and held in intimate contact with the rubber surface of the tire by inflation of the latter. This may be applied as a complete covering or as strips composed of parallel chains secured to each other laterally and applied to the tire either circumferentially, transversely or diagonally of the tread.

Having briefly described in a general way something of the nature and objects of my invention, I will now describe the same more in detail in connection with the drawings forming part of this application wherein,—

Figure 1 is a plan view of a section of chain link tire covering, of a width sufficient for a small tire but broken away longitudinally so as to show only a small portion of the circumference or peripheral extent thereof; Fig. 2 is a detail view on a larger scale and partly in section, showing a portion of the chain fabric with certain circular and triangular rivets which may be employed to cover and protect the interstices between links. Fig. 3 is a detail section on the line 3, 3, of Fig. 2 showing a circular rivet in place. Fig. 4 is a detail view showing part of a wheel and tire with a covering applied thereto.

In the practice of my invention, any suitable or desired arrangement of chain link fabric or strips thereof may be employed, but I prefer a triangular hexagonal arrangement of closely set, plane or untwisted links, because it possesses many advantages, among which may be noted close interlinkage and interdependence of movement, free distribution and direct transmission of strain along three sets of closely spaced parallel lines of chain crossing each other at angles of 60°. The fabric mesh may, however, be rectangular or other desired arrangement and the links may be of any suitable known or desired construction.

I prefer to determine the circumferential extent of the fabric along the tread in the direct line of one of these sets of parallel chains so that the fabric will be practically inexpansible and of fixed diameter under the stresses of inflation of the tire and distortion thereof under load. In the triangular arrangement this leaves the other two sets of parallel chains extending, not directly across the tread as they would if the mesh were rectangular, but at an angle of 30° to such transverse direction, and 60° from the circumferential direction of the tread. By this arrangement, strains arising from the application of power to the wheels, either for driving or braking of the vehicle, take effect upon the links in contact with the ground at acute angles and not at right angles so that the strain is applied obliquely in a direction in which the effective strength is greater. The three sets of lines of links, normally perpendicular to the surface of the tire, act as rigid lugs yieldingly held. The sets in line with the tread tend to prevent lateral slipping. The sets crossing the tread obliquely tend to prevent circumferential slip and because of the oblique arrangement tend to free themselves of mud, stones, etc. In this arrangement, the horizontally disposed links may be made practically tangent to each other and thus more effectively cover and protect the tire. Furthermore, the laterally projecting triangular portions or points, 11, 11, which serve to distribute the transverse strains, work out at 60° angles instead of 120° angles, which would result if the tread ran the other way of the chain fabric and instead of the 90° angle, which would result if the mesh were quadrilateral or rectangular.

From the above illustrative explanation it will be obvious that the preferred arrangement shown works out well for all stresses.

Where the fabric is skeletonized or cut away, for instance as indicated by the dotted line shown at the bottom of Fig. 1, so that the parallel chains take the form of obliquely extending bands, each band as a whole forms a projection above the surface of the tire to prevent slipping, skidding or sluing in much the same way as the individual links described above. Such bands may therefore be formed of any desired link fabric having few or none of the links normal to the surface of the tire. When the fabric is skeletonized in this way, links forming the corresponding diamond shape spaces will of course be omitted in each of the regular recurring figures of the pattern. This modification is of advantage in certain cases as to greatly decrease the total weight of the covering and although it decreases the protection afforded the tire it is nevertheless very efficient for preventing slipping, skidding and sluing.

The triangular-hexagonal fabric may be skeletonized by omitting other key links and their connecting web links and the location of the spaces left by such omitted links may be distributed through the pattern of the fabric in a multiplicity of ways and patterns which will be obvious. When patterns of mesh other than the triangular-hexagonal mesh are used the fabric may be similarly skeletonized by omitting links in ways which will be obvious.

In the preferred triangular-hexagonal arrangement the covering is composed of links 1, lying in the plane of the fabric, and of the radially extending links 2, 12 preferably lying in planes perpendicular thereto. For convenience, these may be termed respectively key links 1, 1 and radial or web links 2, 12. These terms are used for purposes of identification and they are intended to cover many other link patterns, besides the hexagonal patterns.

In order to protect the tire, the key links may be made to cover the maximum surface by arranging them as tangential circles with a slight clearance. For similar reasons, the internal diameter or opening of the key links 1 is preferably three times the diameter of the wire or other material of which the radial or web links 2, 12 are formed, with a small amount added to prevent binding or locking of the links 2, 12. The latter, centering in a group of six within each key link 1, form an approximately hexagonal inscribed figure which as against any thrust would have the effect of an arch creating undesirable friction and stresses unless such clearance were provided. Also, the links 2, 12 for similar reasons are formed with an internal diameter equal to two diameters of the wire or material out of which the links 1 are formed, a small additional allowance being made in this case also for clearance. The links 1 are preferably circular whereas the links 2, 12 may be circular or they may be given a flattened or elongated form wherein the smaller internal diameter is only a little over a single diameter of the material out of which the links are formed. It will thus be seen that the diameter of one set of links is preferably determined by the diameter of the material out of which the other set of links is formed and preferably the diameter of the material is the same in both. It is evident, however, that in some instances it may be found preferable to form the key links 1 of material of greater diameter because the total strain which can be communicated to one of these links by the six radial links acting thereon is greater than would normally come on any one of said radial links. Furthermore the cross section of the material of which the links are made may be other than circular and may be of greater diameter in the plane of the fabric than in a direction transverse thereto.

Certain of the links are split in order that they may be assembled to form the fabric and such links may be welded after assemblage or may be hardened without welding. Where not welded, the split is preferably on the inner side next the tire. Such a split is preferably at a right angle directly across the wire or other material of which the link is formed since any pronounced bevel to form a lap joint or split would require acute points or edges more easily displaced or broken and therefore more likely to injure the tire. When not welded the splits may be slightly indented or bent inward as shown in dotted lines at 22 in Fig. 3. When this expedient is employed care should be taken not to clamp or bind the links 1, 1 encircled by the bends and for this reason the ends of the wire blank may be slightly bent at one or both ends before being bent to encircle the links 1, 1.

The fewest possible split links necessary for assemblage of the fabric, are attained when the links 1, 1 are split and links 2, 12 are solid, but as the strain on these links 1, 1 is generally greater than on links 2, 12 and as the centering of six links in links 1, 1 renders welding thereof difficult there are advantages in making the latter solid and putting the splits in links 2, 12.

If the links 2, 12 are not welded they will be weaker but where all links are formed from the same diameter wire this really tends to uniformity of resistance to stress because links 2, 12 being unwelded are something like half as strong as welded links 1, 1 made of the same size wire and they only need to be about half as strong because the average stress thereon should be only about half as much.

For various reasons I prefer to form the links from cheap soft iron either punched from a sheet or built up from lengths of wire of the desired diameter, or part of them may be punched and part formed from wire. After being properly formed and sized to distribute strains and provide proper clearance of contacting surfaces, the whole fabric may then be case hardened and the links thus rendered rigid and durable.

Preferably the narrowest portion of the chain fabric should be of the width of the thread or say third to a half of the transverse circumference of the tire though it may be either greater or less than this.

If desired the points at 11 need not be worked out in a perfect saw tooth pattern but there may be suitable spaces between the bases of the triangular lateral projections, such for instance as would exist where the links 21 shown in dotted lines are added for purposes of increasing the minimum width of the fabric.

While the arrangement shown in Fig. 1 is adapted for a comparatively small tire, the fabric may be worked out along the same lines to increase either the width of the tread portion, or the length and circumferential distribution of the laterally extending triangular points.

Any suitable means other than the points 11 may be used for securing the fabric in position though the latter arrangement is desirable as strains due to inflation of the tire are balanced and well distributed about the circumference instead of being largely concentrated in the transverse line or plane of the securing or fastening means.

In order to improve the function of the fabric as a protector and armor I may fill in the uncovered circles or spaces at the center of the links 1 with circular rivets 5, having shanks 15, the head 5 being preferably of greater diameter than the upset portion 25. The latter should be arranged and formed so as not to injure or wear the rubber tire.

The triangular spaces between each contiguous or tangentially arranged set of three links 1 may be filled in by similar rivets adapted to fit the space. In this instance the head 6 will be preferably triangular to fit the space between links 2, 12 and the shank 16 may be triangular but in the other direction so as to fit the space between links 1, 1.

The final sizing of the complete tire covering may be accomplished before hardening by stretching on a suitable expanding mandrel to the exact required size, the dimensions having been of course previously made as nearly exact as possible.

The above method may also be employed to impart a certain amount of crowning to the covering so that it may conform to the surface of the tire especially if all of the radial or web links 2, 12 are first given an approximately circular form. Such arrangement permits of unequally flattening and thus lengthening lines of links near the center line of the tread, the amount of flattening of all links in the same chain line around the tread parallel to the plane of the wheel being the same, and the lines of links nearest the center line being flattened the most. By such operation the wheel diameters at the center of the tread portion of the web may be increased the required amount by the flattening and the resulting elongation of the individual links. The links at the edge remaining unflattened or flattened in a less degree, the parallel lines or circles around the wheel at the center of the tread will be greater by the required amount. Such crowning may also be effected in the original construction of the fabric either by using smaller diameters of wire as the material for the links and maintaining the proportion, construction and clearance exactly similar, only on a smaller scale commensurate with the decrease of diameter of wire used, or a similar result may be brought about by merely increasing the clearance at the center of the tread by increasing the interior diameters of key links 1 or increasing the long diameters of the radial or web links 2, 12.

By carrying either one or all of the above expedients to the extreme, the fabric may be worked out in the form of a nearly or quite complete endless tube split circumferentially around the inside.

Where the minimum width of the fabric is small, compared to the size of the tire so that only a comparatively flat zone at the tread is completely covered, the above expedients for crowning or varying the diameter of the covering may possibly be omitted as the cut away spaces between the triangular lateral extensions 11 will sufficiently provide for the zones of markedly smaller diameter and this in connection with the elasticity of the tire when inflated will practically obviate puckering or fullness of the fabric at said smaller zones while the circumferential hoop or chain will fix such smaller diameter.

Where the filling rivets 5, 6 are used care must be taken in fixing them in place to insure such looseness of fit as may be necessary to prevent binding, as the latter would result in unnecessary wear and tear and in comparative inflexibilty of the fabric. Rather more clearance will be necessary for rivets 6 than rivets 5 because the movements of the portions of links 1 contacting therewith are not exactly on arcs of the surface of the cylindrical wire of which they are preferably composed whereas movements of the links 2, 12 are normally along curvatures of their surfaces.

The protected area afforded by the rivets or filling pieces referred to, may be formed by fins or V-shaped ribs formed on the links. For instance the key links may be made more or less hexagonal in plan as shown at 31, Fig. 2. Similar lateral fins or projections from radial or web links 2, 12 as shown in dotted lines at 2ª, 12ª Fig. 2 might serve the same purpose. In both cases ample clearance should be provided between adjacent portions of the fins or projections and edges and points of the latter should be rounded off.

Where rivets are used the contour of adjacent portions of the surface of the links may be modified or molded to fit the latter. The links 2, 12 may be made V-shaped in cross sectional outline to fill more completely the key links as shown at 32, Fig. 3.

It will be obvious from Fig. 4 that the preferred manner of securing the fabric in position is to secure the links 11, 11 around the tire 48 and felly 49 while the tire is deflated, as by a circumferential steel hoop 50 adjusted to proper diameter by turnbuckle 51 and by securing opposite links 11, 11 to each other or to the same spoke 52 or to a suitable stud or studs 53 inserted in the felly on the back side thereof by suitable ties 54 extending around the same. One or all of these means may be used.

As has been explained the surface or covering which I use, especially where employed on pneumatic or similar tires, is supplemental to the rubber surface and except where intended to serve as tire armor, need not necessarily cover more than a fraction of the surface, considerable spaces being left open. It will therefore be evident that the terms surface and covering as used herein are generic and cover all forms described.

I claim:

1. A tire covering of chain fabric comprising closely adjacent hexagonally arranged links parallel with the surface of the fabric and other links arranged to be held perpendicular thereto.

2. A tire covering of chain fabric comprising hexagonally arranged links parallel with the surface of the fabric and connecting links perpendicular thereto and interlinked therewith, six of the latter with each of the former, said links being so formed as to be normally maintained in their said relative positions, when secured to the tire.

3. A tire covering having a tread portion consisting of links arranged to form three sets of parallel lines of direct chain connection, one set of said lines extending circumferentially around the tread of the tire and two of said sets crossing the tread at equal opposite angles.

4. A tire covering of chain fabric consisting solely of links substantially parallel with the tire surface interlinked with other links normally substantially perpendicular thereto, said chains arranged to have regular angularly disposed intersecting lines of direct chain connection and triangular laterally extending portions of the fabric worked out or formed along such intersecting lines, to form points at approximately a sixty degree angle.

5. A tire covering comprising chain fabric consisting solely of links substantially parallel with the tire surface interlinked with other links normally substantially perpendicular thereto, said chains arranged to have regular equiangularly disposed intersecting lines of direct chain connection and triangular laterally extending securing points, formed of chains following lines of the pattern of the fabric and meeting at an angle of approximately sixty degrees.

6. A tire covering comprising chain fabric arranged to have sets of parallel lines of direct chain connection, one set of said lines extending circumferentially around the tread of the tire together with triangular oppositely disposed laterally extending portions of said fabric.

7. A tire covering of chain fabric consisting solely of links substantially parallel with the tire surface interlinked with other links normally substantially perpendicular thereto, said chains arranged to have regular angularly disposed intersecting lines of direct chain connection and triangular laterally extending portions of the fabric along opposite edges of the body portions and worked out or formed along said intersecting lines, at angles of approximately sixty degrees.

8. A tire covering of metallic fabric consisting solely of links substantially parallel with the tire surface interlinked with other links normally substantially perpendicular thereto, said chains comprising a body portion and oppositely arranged, laterally extending triangular portions for securing the same and for distributing stress along the sides thereof.

9. A tire covering of chain fabric comprising closely adjacent links parallel with the surface of the fabric and, interlinked therewith, other links flattened on the side adjacent the tire so as to be held normally substantially perpendicular to said surface.

10. A tire covering of chain fabric structurally independent of the tire and consisting of closely adjacent links parallel with the surface of the fabric and, interlinked therewith, flattened links substantially perpendicular to said surface and having an internal minimum diameter approximately equal to the thickness of the material of said first mentioned links at points of interlinkage.

11. A tire covering of chain fabric, consisting of links substantially parallel with the tire surface, disposed in a regular pattern and interlinked with other links fitting the thickness of the material of said key links so as to be normally maintained in a position approximately perpendicular to the tire surface.

12. A tire cover of chain fabric consisting of circular or polygonal key links and flattened web links having an internal transverse dimension approximately equal to the diameter of the material of the key links, whereby said key links are maintained approximately parallel with the surface of the tire and said web links approximately perpendicular thereto.

13. A tire covering of chain fabric, consisting of key links arranged in a hexagonal pattern and flattened web links connecting said key links, said web links having an internal transverse dimension approximately equal to the diameter of the material of the key links whereby said links are maintained approximately parallel with the surface of the tire and said web links approximately perpendicular thereto.

14. A tire cover of chain fabric consisting of circular or polygonal key links and flattened web links having an internal transverse dimension approximately equal to the diameter of the material of the key links, whereby said key links are maintained approximately parallel with the surface of the tire and said web links approximately perpendicular thereto, said links being case hardened to prevent deformation.

15. A tire covering of chain fabric, consisting of key links arranged in a hexagonal pattern and flattened web links connecting said key links, said web links having an internal transverse dimension approximately equal to the diameter of the material of the key links whereby said links are maintained approximately parallel with the surface of the tire and said web links approximately perpendicular thereto, said links being case hardened to prevent deformation.

16. A tire covering comprising angularly intersecting lines of chain formed of solid key links at the points of intersection, the adjacent links interlinked with said solid key links being split links, for the purpose described.

17. A tire covering comprising solid key links and flattened web links split on the side next the tire and having portions adjacent the split inturned or indented.

18. A tire covering of chain fabric comprising key links and web links the internal diameter of the key links being such that the web links substantially fill an annulus of width equal to the diameter of the material of the latter.

19. A tire covering comprising key and web links, the maximum diameter of the web links being slightly more than twice the diameter of the material of the key link.

20. A tire covering comprising key links and web links the internal diameter of the key links being such that the web links will substantially fill an annulus of width equal to the diameter of the material of the latter, the maximum diameter of the web links being slightly more than twice the diameter of the material of the key links.

21. A tire covering of chain fabric comprising hexagonally arranged key links and web links, the internal diameter of the key links being slightly more than three times the diameter of the material of the web links.

22. A tire covering of chain fabric comprising hexagonally arranged key links and web links the internal diameter of the web links being slightly more than twice the diameter of the material of the key links.

23. A tire covering comprising hexagonally arranged key links and web links the internal diameter of the key links being slightly more than three times the diameter of the material of the web links and the maximum diameter of the web links being slightly more than twice the diameter of the key links.

24. A tire covering comprising chain fabric and suitably shaped rivets covering the interstices.

25. A tire covering comprising chain fabric and suitably shaped filling pieces inserted in the interstices.

26. A tire covering comprising bands of chain fabric, each band consisting of two or more intersecting chains laterally interconnected, said bands of fabric being separated by open spaces and extending diagonally across the tread of the tire.

27. A tire covering comprising bands of chain fabric, each band consisting of two or more intersecting interlinked parallel lines of chain, said bands of fabric extending diagonally across the tread of the tire.

28. A tire covering comprising bands of chain fabric, each band consisting of two or more interlinked parallel lines of chain, said bands of fabric extending diagonally across the tread of the tire and intersecting other similar bands at that portion of their length near where they cross the tread of the tire.

Signed at New York city, in the county of New York, and State of New York, this 23" day of August, A. D. 1095.

PETER COOPER HEWITT.

Witnesses:
JOHN B. PERRY,
K. A. MORRIS.